Patented Aug. 4, 1953

2,647,885

UNITED STATES PATENT OFFICE 2,647,885

PRODUCTION OF POLYETHYLENE TEREPHTHALATE USING ANTIMONY TRIOXIDE AS POLYMERIZATION CATALYST

Harry R. Billica, Seaford, Del., assignor to E. I. du Pont de Nemours & Company, Wilmington, Del., a corporation of Delaware No Drawing. Application September 28, 1951, Serial No. 248,890

3 Claims. (Cl. 260—75)

This invention relates to an improved method for preparing a synthetic linear polyester which is essentially the condensation product of a dihydric alcohol and a dibasic acid, and more particularly to the preparation of polyethylene terephthalate, a film- and fiber-forming synthetic linear polyester.

The production of the novel class of film- and fiber-forming, linear polyesters of terephthalic acid and a glycol of the series $HO(CH_2)_nOH$ where "$n$" is an integer from 2 to 10 inclusive, is fully disclosed in U. S. P. 2,465,319 to Whinfield and Dickson. From a commercial standpoint, one of the most attractive polymers of this class is polyethylene terephthalate; and the most promising process for its produceion comprises carrying out an ester interchange between ethylene glycol and dimethyl terephthalate to form bis-2-hydroxy-ethyl terephthalate monomer which is polymerized to polyethylene terephthalate under reduced pressure and at elevated temperatures.

The above patent discloses a considerable number of catalysts suitable to a varying degree for accelerating the rate of the ester interchange reaction to form bis-2-hydroxy-ethyl telephthalate monomer. Among such catalysts are included sodium, lithium, potassium, calcium, magnesium, zinc, cadmium, and aluminum, as well as alkali metals in the form of their carbonates or other alkaline-reacting salts, for example, the borates; also, the oxides of various of these metals. While these materials are, in general, good catalysts for accelerating the ester interchange reaction, their activity diminishes during the polymerization reaction; and in most instances, it is difficult to secure under acceptable commercial conditions a polyethylene terephthalate of satisfactory quality, i. e., a polymer of high intrinsic viscosity, free of objectionable coloration, and capable of being formed, as by extrusion, into useful filaments and film.

An object of the present invention, therefore, is to provide an improved catalyst for accelerating the polymerization of bis-2-hydroxy-ethyl terephthalate monomer.

Another object is to provide an improved catalyst for accelerating to commercially acceptable rates the polymerization of bis-2-hydroxy-ethyl terephthalate monomer, without substantial impairment of the color and quality of the polyethylene terephthalate. These and other objects will more clearly appear hereinafter.

The above objects are accomplished according to the present invention by carrying out the polymerization of bis-2-hydroxyl-ethyl terephthalate in the presence of a catalytic amount of antimony trioxide.

The present invention resides in the discovery that antimony trioxide greatly accelerates the rate of polymerization. It is well known that a great number of catalysts which are effective for ester interchange between a glycol and a dialkyl ester of terephthalic acid also tend to initiate polymerization, but the catalytic effect of these materials upon polymerization is ineffectual in carrying the polymerization reaction beyond an intrinsic viscosity of about 0.1–0.3. On the other hand, antimony trioxide accelerates the rate of polymerization and provides for rapid polymerization to form polymer of intrinsic viscosity from 0.7–1.0, which may be readily extruded to form excellent films and filaments.

In general, from 0.01%–0.1% of antimony trioxide, based upon the weight of dialkyl terephthalate, will suitably accelerate the rate of polymerization, although a catalyst concentration of about 0.03% is preferred in most instances. It is to be understood that although antimony trioxide has little or no effect in promoting ester interchange, it has substantially no deleterious effect upon the ester interchange reaction; hence, it is highly advantageous to add antimony trioxide along with the ester interchange catalyst to the initial reactants. Hence, the concentrations of antimony trioxide are expressed in terms of the weight of dialkyl terephthalate.

The following examples of preferred embodiments further illustrate the practice and principles of this invention:

Example I

The following ingredients were introduced into a three-necked reaction flask fitted with a stirrer and a condenser:

Dimethyl terephthalate, 58 lbs.
Ethylene glycol, 40 lbs.
Calcium hydride, 0.0174 lb.  } 0.03% based upon the weight of dimethyl terephthalate.
Antimony trioxide, 0.0174 lb.

The ester interchange reaction started at 118° C., and 3.5 hours were required to remove the methanol formed. The resulting material, principally bis-2-hydroxy-ethyl terephthalate, was transferred to a 50-pound stainless steel autoclave equipped with a stainless steel stirrer and heated to about 275° C. The autoclave was evacuated gradually through an ice trap and a Dry- Ice trap; and, when the pressure in the autoclave was reduced to about 0.5 mm. of mercury, the polymerization was carried out for 5.1 hours at this full vacuum. The intrinsic viscosity of the resulting polymer was 0.66, and the polymer had a very pale green tint.

The expression, "intrinsic viscosity," denoted by this symbol: $(n)_0$, is used herein as a measure of the degree of polymerization of the polyester and may be defined as:

$$\frac{\text{limit } ln(n)_r}{C}$$

as C approaches 0, wherein $n_r$ is the viscosity of a dilute Fomal solution of the polyester divided by the viscosity of the Fomal per se measured in the same units at the same temperature, and C is the concentration in grams of polyester per 100 cc. of solution. (Fomal comprises 58.8 parts by weight of phenol and 48.2 parts by weight of trichlorophenol.)

Example II

The procedure of Example I was repeated except that the catalyst employed was 0.0058 pound of litharge (0.01% by weight of DMT). The ester interchange reaction began at 170° C. and required 4.5 hours for complete removal of methanol. The subsequent polymerization required 9.3 hours at full vacuum to obtain polyethylene terephthalate having an intrinsic viscosity of 0.66. The color of the polymer was a medium amber, much darker than that of the previous example.

Example III

The following ingredients were introduced into a stainless steel batch reactor equipped with a stirrer and a condenser:

Dimethyl terephthalate, 240 lbs.
Ethylene glycol, 155 lbs.
Calcium acetate, 0.312 lb. (0.13% based upon weight of dimethyl terephthalate)
Antimony trioxide, 0.072 lb. (0.03% based upon weight of dimethyl terephthalate)

The ester interchange reaction began at 148° C. and required 2.6 hours for complete removal of methanol. The resulting bis-2-hydroxy-ethyl terephthalate was transferred to a 250-pound stainless steel autoclave equipped with a stainless steel stirrer. The autoclave was evacuated gradually through an ice trap and a Dry-Ice trap while the temperature of the batch was raised to about 275° C. The pressure in the autoclave was reduced to about 0.5 mm. of mercury, and the polymerization was carried out for 7.1 hours at this full vacuum. The intrinsic viscosity of the resulting polymer was 0.55 as measured in Fomal. The color of the polymer melt was a very pale green.

Example IV

In this experiment, the ester interchange reaction was carried out in a liter flask fitted with an 18" glass fractionating column (2" in diameter) packed with 3/8" glass rings; and the fractionating column was fitted with a side take-off condenser. The flask was heated electrically, and the amount of heat to the flask was controlled by varying the power input. Two hundred and forty-two grams of dimethyl terephthalate were reacted with 180 cc. of ethylene glycol. A homogeneous mixture of glycol and dimethyl terephthalate was made by blending these materials at a temperature between 135–150° C. Dimethyl terephthalate melts at about 140° C. The catalyst in the example consisted of 0.007% lithium hydride and 0.035% zinc acetate. As described and claimed in copending application of Joseph L. Vodonik, U. S. Serial No. 248,708, filed September 28, 1951, the combination of lithium hydride and zinc acetate is for the purpose of promoting the ester interchange reaction; and this combination has relatively little effect in promoting polymerization.

In this example, the ester interchange reaction was complete in 42 minutes. The ester interchange reaction began at about 150° C., and the temperature of the reaction at completion was 213° C.

Polymerization of the resulting bis-2-hydroxyethyl terephthalate was initiated in the reaction flask by gradually raising the temperature from 213° C. to 265° C. During this temperature rise, approximately 70 cc. of ethylene glycol were removed from the reaction. At this stage, two 15-gram portions of prepolymer (viscosity about 0.1) were withdrawn from the reaction flask. One portion was catalyzed with 0.003 gram of antimony trioxide, and no additional catalyst was added to the other portion. The two portions of prepolymer were transferred to separate polymer tubes; the polymer tubes were sealed; and polymerization was carried out at 275° C. for 3 hours. The resulting polymer prepared from the prepolymer catalyzed with antimony trioxide had an intrinsic viscosity of 0.78, and the polymer prepared from the uncatalyzed prepolymer had an intrinsic viscosity of 0.55. Both polymer samples were substantially colorless.

The equipment employed in this example was comprised of a continuous ester interchange tower, a continuous prepolymerizer in the form of an inverted bubble cap column, and a final polymerizer in the form of a cylindrical vessel containing rotating intermeshing disks. The ester interchange tower was operated at atmospheric pressure, and it was composed of a reaction section and a reflux section. The reflux section was a packed column positioned on top of the reaction section, and vapors above 65° C. (the boiling point of methanol at atmospheric pressure) were refluxed to the reaction section. Two mols of methanol were removed for every mol of dimethyl terephthalate fed to the tower. The reaction section was comprised of 12 plates, each plate having a downflow pipe. The top plate on which the raw materials were fed was maintained at a temperature of about 169° C. Each plate below the first plate was maintained at a somewhat higher temperature than the one above, and a reboiler below the last plate was maintained at 230° C.

Dimethyl terephthalate, at the rate of 50 pounds per hour, and ethylene glycol, at the rate of about 30 pounds per hour (mol ratio of glycol to dimethyl terephthalate was 1.9/1), were fed onto the top plate of the ester interchange column. A small amount of ethylene glycol containing dissolved lithium hydride and zinc acetate was also fed to the top plate. The amount of each of these catalytic materials in the glycol amounted to 0.006% of lithium hydride and 0.035% of zinc acetate, based upon the weight of dimethyl terephthalate. A paste of antimony trioxide with glycol was prepared, and this was also introduced into the top of the ester interchange column by means of a grease gun type of injector. The amount of antimony trioxide introduced was 0.03%, based upon the weight of dimethyl terephthalate.

Monomeric bis-2-hydroxy-ethyl terephthalate was drawn from the bottom of the ester interchange tower, and the monomer was injected into the bottom of the prepolymerizer column. This column was a type of inverted bubble cap column, the pressure at the bottom and top being 10 mm. of mercury and 3.5 mm. of mercury, respectively. As the monomeric material flowed upward through the upcommers from plate to plate, the material tended to flash and spray vigorously upon each plate so that a large surface area was exposed. Ethylene glycol was evolved from the top of this column. The bottom of the column was maintained at 255° C., and the top was at 270° C.

Prepolymerized material having an intrinsic viscosity of about 0.25 was drawn from the top of the prepolymerization column, and this material was introduced into a final polymerizer. This final polymerizer was horizontally disposed, and it took the form of a cylindrical vessel which housed revolving intermeshing disks which were designed to provide exposure of a large surface area of the reaction mass to the effects of the vacuum maintained at 3.5 mm. of mercury. The revolving disks further served to move the polymer from one end of the vessel to the other. This final polymerizer was maintained at a temperature of 280°–285° C.

Polyethylene terephthalate having an intrinsic viscosity of 0.62 was removed from the final polymerizer at the rate of 50 pounds per hour by means of a screw pump.

The foregoing examples are merely illustrative, it being understood that the present invention broadly comprises carrying out the polymerization of bis-2-hydroxy-ethyl terephthalate under super polyester-forming conditions in the presence of a catalytic amount of antimony trioxide.

It is to be understood that any well known ester interchange catalyst or combination thereof may be employed to initiate and accelerate the reaction between a dialkyl terephthalate and a glycol to produce bis-2-hydroxy-ethyl terephthalate. A great number of ester interchange catalysts may be used, but it is preferred to employ a combination of lithium hydride and a glycol-soluble metal salt of a carboxylic acid, the metal being selected from the group consisting of cadmium, magnesium and zinc. This ester interchange catalyst system is fully described and claimed in U. S. Serial No. 248,708 filed September 28, 1951, in the name of Joseph L. Vodonik. Other well known ester interchange catalysts include those disclosed in U. S. P. 2,465,319; namely, lithium, sodium, potassium, calcium, magnesium, zinc cadmium, aluminum, alkali metals in the form of their carbonates or other alkaline reacting salts, and magnesium oxide; alkili metal and alkaline earth metal hydrides such as lithium, sodium and calcium hydrides disclosed and claimed in copending application U. S. Serial No. 248,679 filed September 28, 1951, in the name of Harry R. Billica; litharge as disclosed and claimed in U. S. P. 2,534,028; zinc borate as disclosed and claimed in U. S. P. 2,518,283; various calcium compounds such as calcium oxide, calcium peroxide, calcium hydroxide, calcium carbide, calcium cyanamide, calcium bromide, calcium borate, calcium titanate, etc., as disclosed and claimed in copending application U. S. Serial No. 264,852, filed January 3, 1952, in the name of Harry R. Billica and J. T. Carriel. It is to be further understood that the overall temperature conditions of the ester interchange reaction will depend to a certain degree upon the particular ester interchange catalyst or combinations thereof which are employed to produce bis-2-hydroxy-ethyl terephthalate monomer. The initial condensation or ester interchange may be conveniently carried out at atmospheric pressure and at a temperaure range between 110° C. and 260° C., preferably between 130° C. and 230° C. The reaction may be carried out under pressures above or below atmospheric pressure.

As illustrated in the foregoing examples, the polymerization reaction may be effected in the liquid phase or, as illustrated in U. S. P. 2,534,028, the reaction may be conducted in the solid phase. In the liquid phase, the reaction must be carried out at reduced pressure in the vicinity of 0.05–20 mm. of mercury, 0.05–5.0 mm. being preferred for optimum results. The reduced pressure is necessary to remove the free ethylene glycol which is evolved from the polymer as a result of the condensation reaction, since the reaction mixture is very viscous. Temperatures between about 230° and 290° C., and preferably about 260° and 275° C., should be maintained during the polymerization step.

The duration of polymerization usually depends upon the size of the batch and upon the particular method of polymerization, i. e., on a batch scale or in a continuous process. Furthermore, the type of catalyst employed, catalyst concentration, temperature and intrinsic viscosity desired also affect the duration of the overall ester interchange and polymerization cycle. When carrying out large scale batch reactions in the neighborhood of about 2,000 pounds of material, the ester interchange portion of the reaction usually takes from 4 to 6 hours, smaller batches taking from 2 to 4 hours. From the standpoint of commercial operation, it is highly desirable not to have too long a polymerization cycle. Consequently, catalyst concentrations are adjusted to such an extent and equipment providing for large surface area generation is employed to provide rapid polymerization rates and thereby avoid excessive degradation of the polymer which may be caused by undue exposure to polymerization conditions.

Continuous polymerization carried out in the general type of apparatus described in Example V is preferred. In such an apparatus, the polymerizing mass is in a continuous state of agitation, thereby providing for rapid removal of ethylene glycol. In designing equipment for the polymerization step, the main objective is to provide for rapid and continuous removal of ethylene glycol from the polymerizing mass. Continuous processes tend to reach this objective; whereas, it is more difficult to attain in batch equipment, for example, a large autoclave. In batch reactions, it is highly desirable to conduct polymerization in a vessel which provides for maximum surface area generation. In essence, this means that agitation of the polymerizing mass should provide for the maximum exposure of the polymerizing mass to the effect of the vacuum in order to cause rapid evolution of ethylene glycol. For example, relatively rapid agitation of a batch of polymerizing monomer in an autoclave which is approximately half-full causes the polymerizing liquid to splash against the upper walls of the autoclave, thereby exposing a relatively large surface area and effecting rapid evolution of ethylene glycol. This is what is meant by large surface area generation; and any type of equipment which provides this is highly desirable for preventing the occurrence of side reactions, particularly when using the highly active catalyst of the present invention.

The intrinsic viscosity desired for a particular polymer mainly depends upon the ultimate use of the polymer and the process of preparing various end products. For example, if film is to be extruded directly from the polymer, the intrinsic viscosity may be as low as 0.55 and is usually between 0.60 and 0.75. If the molten polymer, as it is withdrawn from the polymerization reaction, is cast and subdivided into flake for subsequent extrusion into film, the intrinsic viscosity of the polymer should be between 0.70 and 1.0. This is because there is usually a slight viscosity degradation in subsequent melting and extruding of the flake. Depending upon the particular end use for filaments extruded from polyethylene glycol terephthalate, the intrinsic viscosity will vary from 0.30–1.2.

With antimony trioxide, polymers which are especially adaptable for extrusion into highly transparent film are readily obtainable. In film form, polyethylene terephthalate may be used in a large variety of applications; and, owing to the outstanding strength and toughness of the film, it can be used in calipers as low as 0.00025″. On the other hand, the films are transparent and of high clarity in calipers up to 0.005″–0.010″. Included among the general and many specific uses for polyethylene terephthalate film are the following: general wrapping and packaging of items such as rice, dried beans, sugar, coffee, fresh produce, soap powders, cement, automobile tires, textiles, greased and untreated machine parts, hardware, gift wrapping, etc.; packaging of articles to be sterilized such as medicaments, instruments, chemicals, ointments, gauze, bandages and the like; packaging of foodstuffs which may be heated in the package, such as hamburgers, frankfurters, popcorn, etc.; glass replacement for storm, greenhouse and chicken house windows; polarizing film for automobile headlights and windshields; windows for containers and envelopes; transparent cans; container and bottle cap liners; laminations with metal foil to give metallic effects in fabrics; laminations with wood, paper or fabrics for pictures, book covers, wall protectors for around light switches, etc.; wall paper in clear, pigmented or printed form; millinery applications, for example, in braid form, either alone or laminated to another film of a different color; ropes and belts fabricated by twisting and/or braiding ribbons or filaments; tare tapes for packages. i. e., cigarette packages; pressure sensitive tapes and adhesive tapes; various electrical applications such as slot insulation for motors, small coils in the form of metal laminations for telephone and radio equipment, primary insulation for heat-resistant wire, pressure sensitive electrical tape, split mica insulating tape, i. e., mica sheets laminated between film, small condensers, i. e., metal foil laminated to film, weather-resistant electrical wire, i. e., a conductor wrapped with film and coated with asphalt, and wrapping for submerged pipe to insulate against ground currents; sound recording discs, tapes and magnetic tapes; plastic binder for strengthening nonwoven fabrics, parting sheets for low pressure laminating; fabric replacement for garment bags, shoulder covers, etc.; tubing for replacing metal tubing in various applications; protective devices such as face shields, goggles, etc.; base film for metalizing by sputtering or other techniques; photograhpic film base for black and white or color photographs; bacteriostatic applications for inhibiting mold growth, mildew or bacteria growth; and various specific applications such as playing cards, greeting cards, milk bottle hoods, drinking straws, tying ribbon, tracing cloth, display and picnic dishes, disposable protectors against war gases, showcase covers, ground for tents, tent windows, printed charts, nomographs and scales, umbrellas, raincoats, file folders, refrigerator bags, tobacco pouches, snare and bass drum heads, tops for convertible automobiles, covers for automobiles in shipment and storage, display card holders, ticker tape, heat shrinkable bands, bottle caps, window shades, etc.

As many widely different embodiments may be made without departing from the scope and spirit of my invention, it is to be understood that said invention is in no wise limited save as set forth in the following claims.

I claim:

1. In the process for producing filament- and film-forming polyethylene terephthalate wherein ethylene glycol is reacted under ester interchange conditions with an alkyl ester of terephthalic acid wherein the alkyl group contains from 1 to 4 carbon atoms, and the resulting glycol terephthalate is polymerized, the improvement which comprises carrying out the polymerization reaction in the presence of catalytic amounts of antimony trioxide.

2. The process which comprises reacting glycol and dimethyl terephthalate in the presence of from 0.01 to 0.1% by weight, based on the weight of dimethyl terephthlate, of antimony trioxide, as polymerization catalyst, under conditions to form filament- and film-forming polyethylene terephthalate.

3. The process of claim 2 wherein the concentration of antimony trioxide is about 0.03% by weight, based on the weight of dimethyl terephthalate.

HARRY R. BILLICA.

References Cited in the file of this patent

UNITED STATES PATENTS

| Number | Name | Date |
|---|---|---|
| 2,465,319 | Whinfield et al. | Mar. 22, 1949 |
| 2,534,028 | Izard | Dec. 12, 1950 |